United States Patent [19]
Bell

[11] Patent Number: 5,930,340
[45] Date of Patent: Jul. 27, 1999

[54] DEVICE AND METHOD FOR ISOLATING VOICE AND DATA SIGNALS ON A COMMON CARRIER

[75] Inventor: Russell W. Bell, Austin, Tex.

[73] Assignee: Advanced Micro Devices, Austin, Tex.

[21] Appl. No.: 08/888,870

[22] Filed: Jul. 7, 1997

[51] Int. Cl.[6] .................................................. H04M 11/00
[52] U.S. Cl. .................................... 379/93.08; 379/90.01; 370/488
[58] Field of Search ................. 379/90.01, 93.01–93.09, 379/93.14, 93.21, 93.28, 93.37, 110.01, 156–173, 387; 370/445, 450, 481, 488–497, 480; 375/288; H04N 7/14

[56] References Cited

U.S. PATENT DOCUMENTS

| | | | |
|---|---|---|---|
| 4,785,448 | 11/1988 | Reichert et al. | |
| 5,479,447 | 12/1995 | Chow et al. | 375/260 |
| 5,757,803 | 5/1998 | Russell et al. | 370/494 |

FOREIGN PATENT DOCUMENTS

| | | | |
|---|---|---|---|
| WO93/11637 | 6/1993 | WIPO | H04N 7/14 |
| WO96/29808 | 9/1996 | WIPO | |

OTHER PUBLICATIONS

SOHO Skyway, Author Unknown, Mar. 26, 1997, pp. 1–2 (Obtained from the Internet at http://www.sohoskyway.net/CustEq.html).

ADSL Forum: General Introduction to Copper Access Technologies, Author Unknown, May 13, 1997, pp. 1–6 (Obtained from the Internet at http://www.adsl.com/general_tutorial.html).

DI Networking Press Releases: DI Networking Offers Superfast Internet Access Solution, Issued By Bernard Binns, May 13, 1997, pp. 1–2 (Obtained from the Internet at http://206.48.77.57/press_11.html).

New DSL Technologies Enable High–Speed Delivery Across "Last Mile", Cisco Systems, Inc., Mar. 17, 1997, pp. 1–4 (Obtained from the Internet at http://www–europe.cisco.com/warp/public/797/3.html).

Alcatel 1000 ADSL Asymmetric Subscriber Line: Ready for the Superhighway?, Published by Alcatel, Undated, pp. 1–8.

*Primary Examiner*—Wing F. Chan
*Attorney, Agent, or Firm*—Merchant, Gould, Smith, Edell, Welter & Schmidt, P.A.

[57] ABSTRACT

A device and system for isolating voice and data signals transmitted on an internal telephone wire network is disclosed. The device further includes voice and/or data connectors coupled to the network. One or more filters are coupled between the network and the voice and data connectors to respectively filter out data and voice signals being transmitted on the network. The internal telephone wire network may be used as a transmission medium for local data transfers. The local data transfers may be performed using digital subscriber line data transmission technologies. The device may be adapted to connect to a standard telephone connector of the network.

15 Claims, 4 Drawing Sheets

DEVICE AND METHOD FOR ISOLATING VOICE AND DATA SIGNALS ON A COMMON CARRIER

FIELD OF THE INVENTION

The present invention is directed to a device and method for isolating voice and data signals on a common carrier, and more particular, to such a device and method where the data signals are transmitted out-of-band with the voice signals.

BACKGROUND

Over the last few years, the demand for high speed communication applications has exploded. The Internet, for example, has grown at astronomical rates over the past several years. A significant number of new Internet subscribers connect from a home or a small office using a personal computer (PC). One draw back typically associated with home and small office Internet connection is the relatively slow speeds at which data is transferred between the Internet service provider and the subscriber's PC. The slow data transmission schemes are typically associated with the relatively low bandwidth capabilities of the subscriber line connecting the home or small office to the telephone company.

In order to leverage the existing subscriber loop copper wiring, estimated to have a undepreciated world wide value of $600 billion dollars, new data transmission technologies have been developed. For example, digital subscriber line (xDSL) technologies have been developed to provide high-speed data transmission from the service provider (e.g., the central office (CO) of the telephone company) to the customer premise over the existing twisted-pair copper wiring. Such xDSL technologies leverage modem technology to increase the data transfer bandwidth of the twisted-pair copper wiring. Typically, xDSL modems are provided at the customer premise and at the central office. The modems communicate in accordance with a protocol established by the particular xDSL approach being used.

When the same transmission medium is used for both data and voice transmissions, it is desirable in many instances to use a different frequency band for data transmissions than for voice transmissions. In other words, the data is transferred out-of-band with the voice band. Because different frequencies are used for the voice and data bands, voice and data signals can be concurrently transferred over the common transmission medium. A typical xDSL transmission scheme, for example, transfers the data signals in a frequency band higher than the voice band. Such techniques are sometimes referred to as data over voice transmission schemes. In a typical example, voice signals may be carried in frequency bands below 4 kHz with data signals being carried in frequencies above the voice band, typically from 50 kHz to 1 MHz.

While xDSL technologies may be implemented in a number of different forms, each approach typically uses an xDSL modem at the customer premise which communicates with an xDSL modem at the CO of the telephone company. At the CO, data transmitted over the subscriber line using xDSL technologies is communicated to Internet or other intranet services, for example, over high-speed wide area networks (WAN) service, such as frame relay or ATM services. Different competing forms of digital subscriber line technologies are collectively designated as xDSL technologies with the "x" representing various one or more letter combinations which are used in front of the "DSL" acronym in order to designate the type of technology being used.

Some of the more prevalent xDSL technologies include HDSL, ADSL, SDSL and VDSL. A brief discussion of some of the differences between a few examples of xDSL technologies is provided below.

HDSL (High Data-rate Digital Subscriber Line) has been used as a low-cost substitute for T1 lines in symmetrical business-oriented wide area network (WAN) applications. HDSL typically supports 768 kbps full-duplex communication over a single twisted pair, T1-speeds over two twisted pairs, and E2 speeds over 3 pairs. SDSL (Single-line Digital Subscriber Line) is well suited for home use or other small subscriber premise and provides T1 or E1 date transmission speeds over a single twisted-pair copper line. SDSL supports standard voice band transmissions and T1/E1 data band transmission simultaneously over the same line.

ADSL (Asymmetric Digital Subscriber Line) exploits asymmetric upstream and downstream data transmission rates to increase the amount of data which may be delivered to the customer premise. ADSL allocates the larger portion of the bandwidth to downstream traffic. Current ADSL schemes achieve data rates ranging from T1 to 9 Mbps downstream and 16 to 640 kbps upstream. ADSL technologies typically use either carrierless amplitude-phase (CAP) modulation or discrete multitone (DMT) modulation techniques. ADSL technology is especially suited for connecting to a customer premise where, as is often the case in Internet applications, a significantly larger portion of data transfers are provided from the service provider to the customer premise than from the customer premise to the service provider.

The various out-of-band data transmission schemes such as xDSL have provided increased bandwidth for transmitting data to a home or small office over existing subscriber lines. However, when more than one data device is provided within the customer premise, the difficulties and costs associated with connecting the multiple devices together and with providing each device with access to the remote data services such as the Internet increase significantly.

SUMMARY OF THE INVENTION

Generally, the present invention relates to isolation of voice signals and data signals transmitted on an internal telephone wire network. In one particular embodiment, a device is provided for isolating voice and out-of-band data signals transmitted on an internal telephone wire network. The device includes a common connector adapted to connect to a standard telephone connector of the internal telephone wire network. The common connector receives the voice signals and the out-of-band data signals from the internal wire network when the common connector is connected to the standard telephone connector. The device further includes a voice connector and a data connector. A first filter is coupled between the common connector and the data connector to filter out voice signals received by the common connector and to pass out-of-band data signals received by the common connector to the data connector. A second filter is coupled between the common connector and the voice connector to filter out the out-of-band data signals received by the common connector and to pass the voice signals received by the common connector to the voice connector.

In another embodiment a device is provided for isolating voice and data band digital subscriber line (xDSL) signals transmitted on an internal telephone wire network. The device includes a voice band filter coupled to receive xDSL signals from the internal telephone wire network. The voice band filter filters out the voice band signals and passes the data band signals as isolated data band signals. A data output port is coupled to the voice band filter to output the isolated data band signals. The device further includes a data band filter coupled to receive the xDSL signals from the internal telephone wire network. The data band filter is configured to filter out the data band signals and to pass the voice band signals as isolated voice signals. A voice output port is coupled to the date band filter to output the isolated voice band signals.

In another embodiment there is provided a system for using a internal telephone wire network as a transmission medium for concurrently transmitting both voice band signals and data band signals. The system includes an internal telephone wire network provided within a customer premise. The network is coupled to a subscriber line which is used to connect the customer premise to a central office of a telephone service provider. A voice device is coupled to the internal telephone wire network to communicate with the central office using voice band signals. A voice band pass filter is coupled between the internal telephone wire network and the voice device to filter out data band signals transmitted on the internal telephone wire network. A data device is also coupled to the internal telephone wire network to communicate with another data device using data band signals. A data band pass filter is coupled between the internal telephone wire network and the data device to filter out voice band signals transmitted on the internal telephone wire network. In one embodiment the second data device is directly coupled to the internal telephone wire network. In another embodiment the second data device is remote from the customer premise.

In still another embodiment of the invention a method of using a telephone wire network located at a customer premise as a transmission medium for transmitting information signals including voice band signals and data band signals is provided. The telephone wire network is connected to a service provider via a subscriber line. In the method. informational signals, including voice band signals and data band signals, are transmitted on the telephone wire network. The informational signals are transferred from the telephone wire network to a voice device located at the customer premise via a voice band pass filter coupled between the telephone wire network and the voice device. The voice band pass filter filters the data band signals out of the informational signals and passes the voice band signals to the voice device. The informational signals are also transferred from the telephone wire network to a data device located at the customer premise via a data band pass filter coupled between the telephone wire network and the data device. The data band pass filter filters the voice band signals out of the informational signals and passes the data band signals to the data device.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
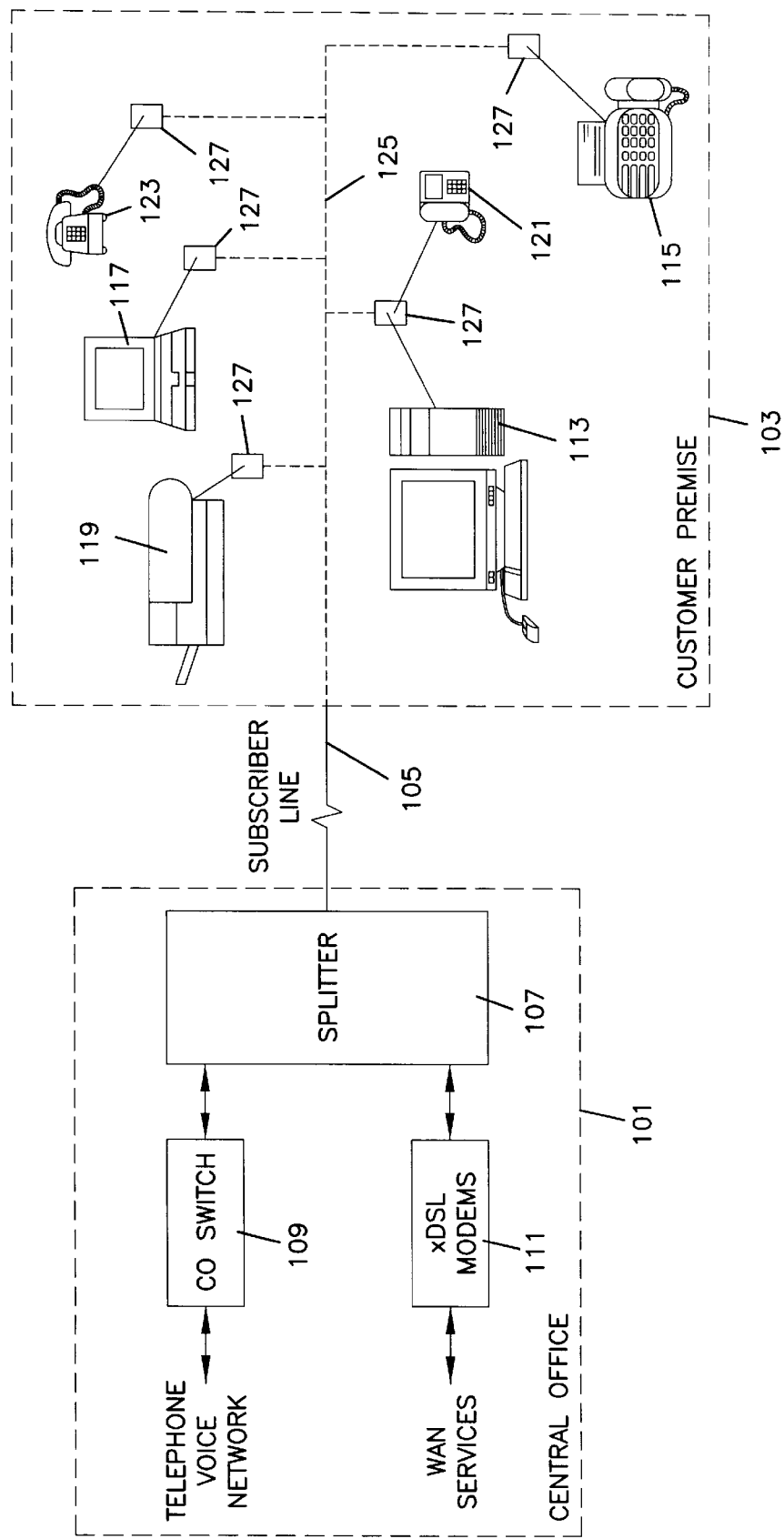
FIG. 1 illustrates an example of the environment in which one embodiment of the present invention is implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a number of different devices and data schemes where a common transmission medium is used to transfer both voice and data signals. The present invention is particularly suited for use in data transmission schemes, such as xDSL, where data signals are transferred out-of band with the voice signals. The invention is also particularly suited for use in a system where a conventional internal telephone wire network is used as a transmission medium for transmitting both data and voice band signals. While the present invention is not so limited, an appreciation of various aspects of the invention is best gained through a discussion of various application examples operating in such environments.

FIG. 1 illustrates an example operating environment in which one particular embodiment of the invention is implemented. In FIG. 1, the central office 101 of a telephone company is coupled to a customer premise 103 via a subscriber line 105. The central office 101 is equipped to provide out-of-band data transfers to the customer premise 103 via the subscriber line 105. In the illustrated example, xDSL data transmission technology is used. The central office 101 includes a splitter 107 which is coupled to the subscriber line 105. The splitter 107 is coupled to a standard switched telephone network via a central office switch 109. The central office also includes a bank of xDSL modems 111 which are used to communicate data band signals over the subscriber line 105. The xDSL modems 111 are coupled to a wide area network (WAN), for example. The splitter 107 separates voice and data band signals received from the subscriber line 105 and provides the respective signals to the central office switch 109 and xDSL modems 111. The splitter also combines voice and data band signals received from the central office switch 109 and xDSL modems 111 and provides the combined signal to the subscriber line 105.

The customer premise 103 includes a number of customer devices each coupled to an internal telephone wire network 125. The customer premise devices depicted in FIG. 1 include a personal computer 113, a fax machine 115, a laptop computer 117, a printer 119, and telephones 121 and 123. The customer devices depicted in FIG. 1 generally fall into two categories. The first category includes voice devices such as conventional telephones and fax machines. These devices use signals in the voice band to communicate with other devices adapted for voice band communication. For example, a telephone at the customer premise 103 may be connected to a remote telephone via the internal telephone wire network 125, the subscriber line 105, the central office switch 109 and the standard public switched telephone network (PSTN).

The second category of customer devices includes data devices such as personal computers, laptop computers, printers and the like. These devices communicate using the data band. The data band devices may communicate with each other over the internal telephone wire network 125. They also may communicate remotely with other data devices via the internal telephone wire network 125, the subscriber line 105, the xDSL modems 111 provided at the central office 101 and a WAN connected to the xDSL modems 111. Certain customer devices may have the capability of communicating in both the voice and data bands. For example, a computer may include a voice band modem and telephony software, such as a built in speaker phone. When communicating with another voice band modem or acting as a speaker phone, the computer communicates in the voice band via the internal telephone wire network 125, the subscriber line 105 and the telephone voice network. The computer may also have an xDSL modem used to receive Internet services. The xDSL modem may communicate with the Internet service provider via the internal telephone wire network 125, the subscriber line 105 and an xDSL modem at connected to the WAN of the central office 101.

When communicating out-of-band data signals, the data devices are typically provided with an appropriate modem, such as an xDSL modem. As noted above, the general modem technology used for out-of-band data communications may be used to establish a local area network connecting the data devices within the customer premise. Each device may include, for example, an xDSL modem configured for local area network communications on the internal telephone wire network. The same general modem may be used for out-of-band data communications over the subscriber line 105 with an xDSL modem provided at the central office 101. The use of out-of-band data transmission schemes, such as xDSL, for transmission of local data band signals over the internal telephone wire network is more fully described in the following commonly assigned copending patent applications of the present inventors: Ser. No. 08/888,651, entitled "Active Isolation System and Method for Allowing Local and Remote Data Transfers Across a Common Data Link," filed concurrently herewith, Ser. No. 08/888,654, entitled "Bandwidth Sharing for Remote and Local Data Transfers Using Multicarrier Modulation Over Common Transmission Medium," filed concurrently herewith, and Ser. No. 08/820,526, entitled "Multipoint Access Protocol Utilizing a Point-To-Point Methodology," filed Mar. 19, 1997, each of which are incorporated herein by reference.

As noted above, the voice and data devices within the customer premise use the internal telephone wire network to transmit both voice and data band signals. When both voice and data band signals are transmitted over a common transmission medium, perhaps simultaneously, the signals in one band might interfere with or otherwise influence signals in the other band. A telephone coupled directly to the internal telephone wire network, for example, may have a non-linear characteristic which causes modulated data band signals to be demodulated into signals that enter the voice band. Such demodulated signals may cause audible noise in the telephone. Voice band signals and ringing signals associated with a telephone, may also interfere with a data stream intended for a data device.

In accordance with one aspect of an embodiment of the present invention, a splitter/filter arrangement 127 is provided at the point of connection to the internal telephone wire network 125. The splitter/filter arrangement 127 is used to compensate for the cross interference between the voice band and data band signals transmitted on the internal telephone wire network 125. More particularly, in the illustrated embodiment, the splitter/filter arrangement 127 is used to couple data and/or voice devices to the internal telephone wire network and filters out voice band signals and/or data band signals as the signals are passed from the internal telephone wire network 125 to the respective devices.

Figure 2:
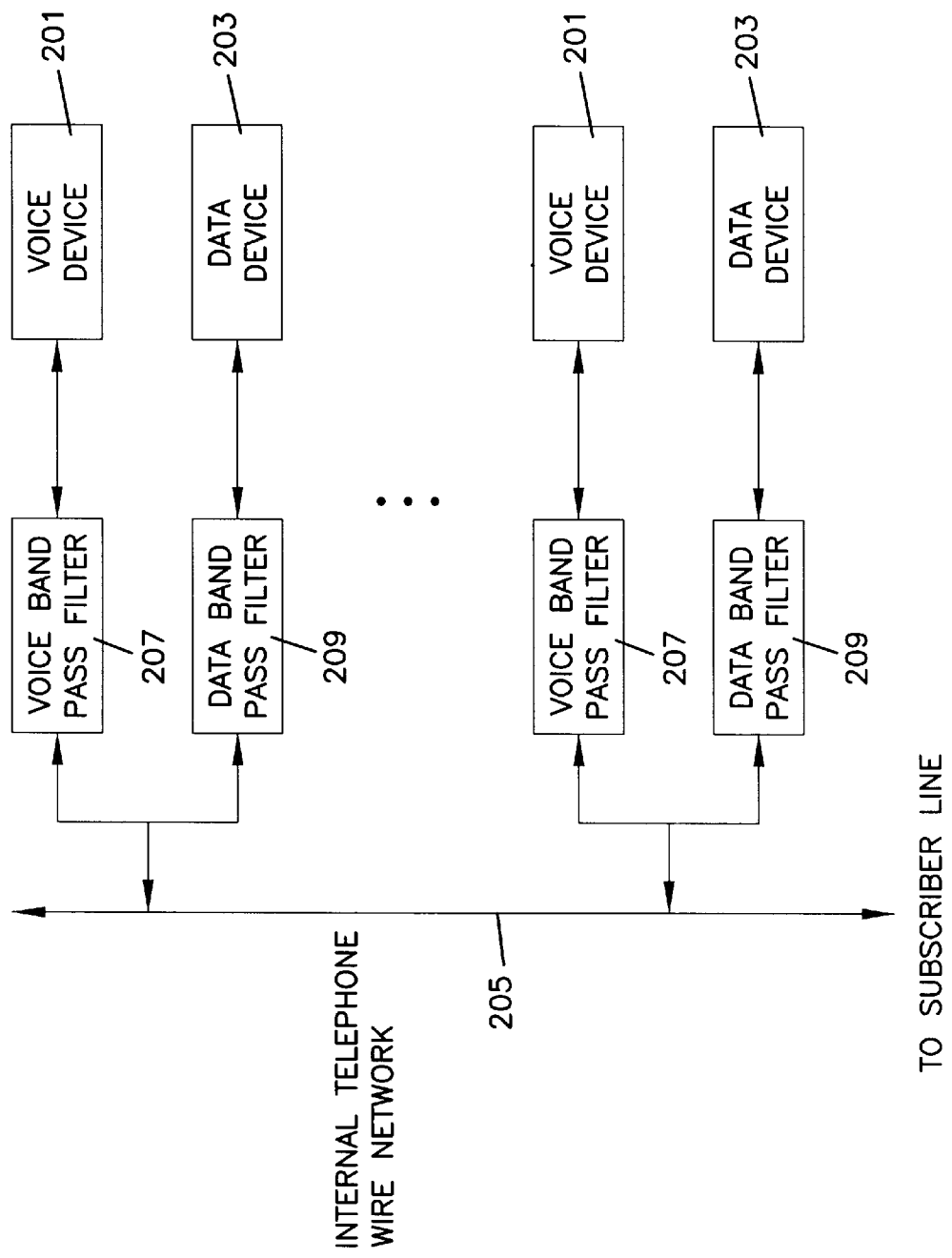
FIG. 2 is a block diagram illustrating another embodiment of the present invention.

FIG. 2 illustrates in block diagram form a local area network arrangement in accordance with another embodiment of the invention. In FIG. 2 voice devices 201 and data devices 203 are coupled to an internal telephone wire network 205. The internal telephone wire network 205 is used as a common transmission medium for both voice and data band signals. The internal telephone wire network 205 is coupled to a subscriber line for transmission of at least voice band signals to and from the central office (not shown). In one particular embodiment, an out-of-band data transmission scheme is used internal to the customer premise only to transmit data between the various data devices 203 provided within the customer premise. In another embodiment, an out-of-band data transmission service is provided for transmission of data. The internal telephone wire network 205 and the subscriber line are also used to communicate data band signals between the central office and the data devices 203.

Voice band pass filters 207 are coupled between the internal telephone wire network 205 and the voice devices 201. Data band pass filters 209 are coupled between the internal telephone wire network 205 and the respective data devices 203. The filters filter out signals not intended for their respective devices and pass information within the frequency band associated with the particular customer device and filter. While the block diagram of FIG. 2 illustrates multiple devices coupled to the internal telephone wire network 205 at a single point (e.g., a splitter arrangement), it will be appreciated that at a given tap point it may be desirable to only connect a single device to the internal telephone wire network 205 Hence only one filter would be required. In FIG. 2, signals received from the voice and data devices 201 and 203 are passed through the respective filters 207 and 209 to the telephone wire network 205. The signals may be transmitted directly from the devices 201 and 203 to the internal telephone wire network 205 without filtering or may be filtered as appropriate.

Figure 3:
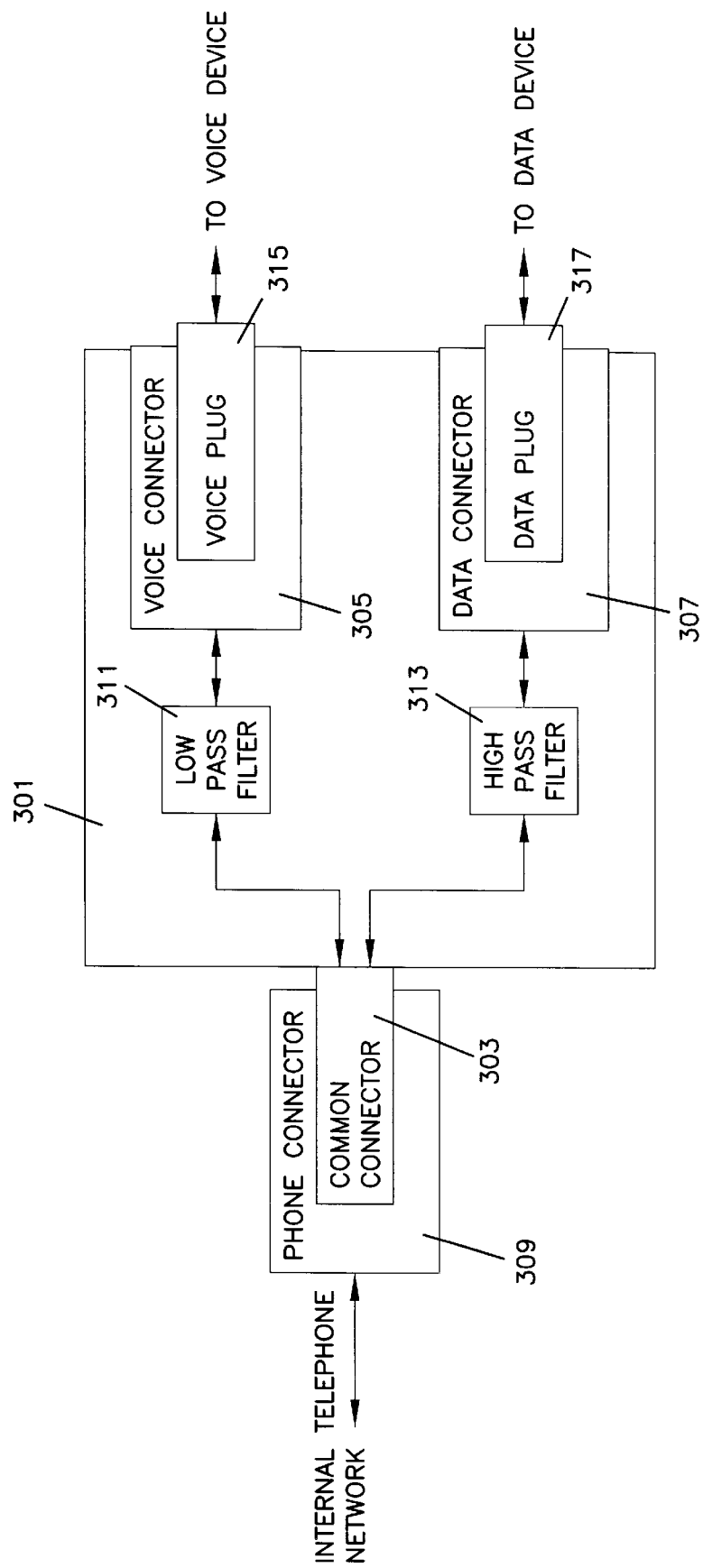
FIG. 3 illustrates a splitter arrangement in accordance with an embodiment of the present invention.

FIG. 3 depicts a block diagram of a modular splitter arrangement for use in connection with another embodiment of the present invention. A splitter 301 includes a common connector 303, a voice connector 305 and a data connector 307. The common connector 303 is adapted to mate with a standard telephone connector 309 which is coupled to the internal telephone wire network. The standard phone connector may be, for example, a typical RJ11 wall connector.

Use of the standard telephone connector 309 to the internal telephone wire network for interconnecting voice and/or data devices to the internal telephone wire network allows the network to be used for transmitting voice band and data band signals without alteration of the network. In other words, an existing telephone wire network, including its existing connectors, can be used for transmission of data and voice band signals by interposing a splitter or other filter arrangement between the existing connectors and the devices. In the embodiment of FIG. 3, because the splitter 301 is adapted to mate with the standard telephone connector, data as well as telephone devices may be connected to the internal telephone wire network at any location where a telephone connector is provided.

The splitter 301 illustrated in FIG. 3 includes a filter 311 which is connected between the common connector 303 and the voice connector 305. A low pass filter 311 is used in this particular embodiment which is appropriate for data transmission schemes, such as xDSL, which transmit the data signals in a frequency band above the voice band. The low pass filter receives voice and data band signals transmitted on the internal telephone wire network from the common connector 303. The low pass filter 311 passes the voice band signals to the voice connector 305 and filters out the data band signals. As stated above, voice signals received by the voice connector 305 may be passed to the common connector 303 with or without filtering as desired.

A high pass filter 313 is provided between the common connector 303 and the data connector 307. The high pass filter 313 filters out the voice band signals and provides the high frequency data band signals to the data connector 307. Data signals received by the data connector 307 may be passed to the common connector 303 with or without filtering.

The voice connector 305 is adapted to communicate with a voice plug 315 which is used to couple a voice device to the splitter 301. The voice connector 305 may be a standard RJ11 telephone connector, for example. In this instance, the voice plug 315 may be a standard telephone RJ11 connector which couples a telephone or other voice device to the voice connector 305. It should be appreciated that the splitter 301 should not be limited to a particular type of connector. Any connector suitable for transmission of the appropriate signals can be used. In the manner described above, the splitter 301 may be used to couple voice devices to the internal telephone wire network without introducing interference from data band signals.

The data connector 307 couples to a data plug 317. The data connector 307 and data plug 317 may also assume an RJ11 form factor or other suitable form factor depending upon the type of data device being coupled to the splitter 301.

Figure 4:
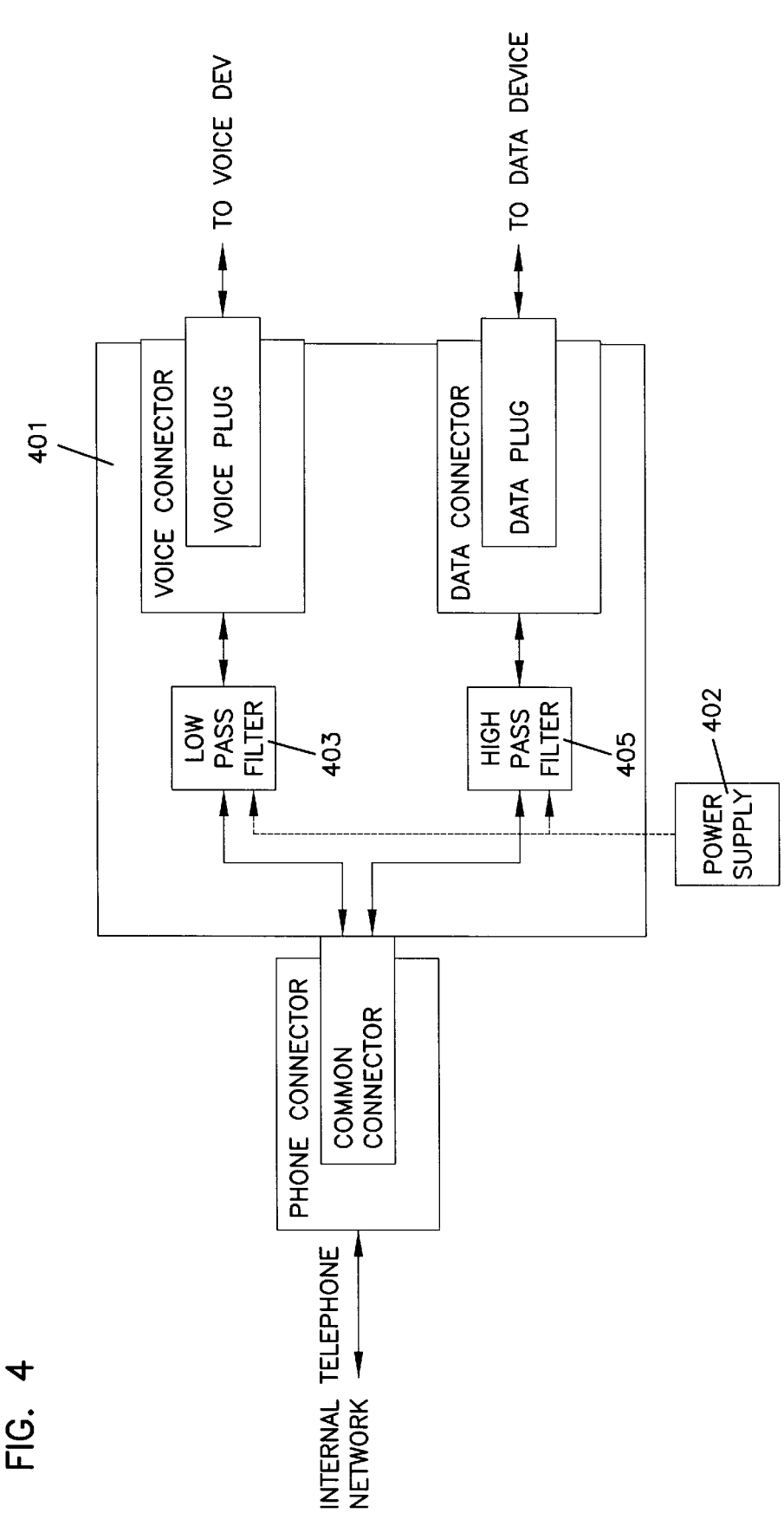
FIG. 4 illustrates another splitter arrangement in accordance with still another embodiment of the invention.

The specific filters used in accordance with the various embodiments described herein will depend on the particular out-of-band data transmission scheme being used. For example, the construction and implementation of the low and high pass filters 311 and 313 illustrated in FIG. 3 will depend on the frequency bands used for the voice and data signals and the relative separation between the two. When the voice and data bands are adequately separated, relatively simple passive filtering techniques may be used to obtain a satisfactory signal-to-noise ratio. The general construction and selection of filter schemes will be apparent to those of skill in the art, having reviewed the present specification In certain embodiments of the invention, it may be desirable to use an aggressive out-of-band data transmission scheme in which the voice and data bands lie relatively close together. In such a system, a more sophisticated active balanced filtering scheme may be required. Such a device is illustrated in FIG. 4. The splitter 401 illustrated in FIG. 4 is generally similar in construction to the splitter arrangement illustrated in FIG. 3. However, a power supply 402 is also provided to supply power to the active low pass and high pass filters 403 and 405. Using active filters 403 and 405, various benefits may be obtained, such as improved performance, higher input impedance, less loading, higher signal drive, and the like. The power supply 402 may use an external "wall wort" transformer, an internal battery or other suitable power supply to power the active components of the splitter electronics. In an alternative embodiment, a trickle charger may also be incorporated into the power supply 402 which receives power directly from the internal telephone network. It will be appreciated that the power supply may be physically incorporated into the structure of the splitter.

As noted above, the present invention is applicable to a variety of different devices and data transmission schemes. Accordingly, the present invention should not be considered limited to the particular examples described above, but rather should be understood to cover all aspects of the invention as fairly set out in the attached claims. Various modifications, equivalent processes as well as numerous schemes to which the present invention will be applicable will be readily apparent to those of skill in the art upon review of the present specification. The claims are intended to cover such modifications, devices and schemes.

I claim:

1. A modular device for isolating voice signals and out-of-band data signals transmitted via a digital subscriber line (xDSL) transmission scheme on an internal telephone wire network having a plurality of standard telephone connectors, the modular device comprising:

a common connector having a male connector plug adapted to connect to a female-receptacle standard telephone connector of the internal telephone wire network, the common connector receiving the voice signals and the out-of-band data signals from the internal wire network when connected to the standard telephone connector;

a data connector having a female receptacle configuration substantially similar to the standard telephone connector;

a voice connector having a female receptacle configuration substantially similar to the standard telephone connector;

a first filter coupled between the common connector and the data connector to filter out voice signals received by the common connector and to pass out-of-band data signals received by the common connector to the data connector;

a second filter coupled between the common connector and the voice connector to filter out the out-of-band data signals received by the common connector and to pass the voice signals received by the common connector to the voice connector; and wherein the common connector, the data connector, the voice connector, and the first and second filters are collectively housed within the modular device which is removably positioned at a point of connection to the internal telephone wire network; and wherein the first filter and the second filter are active filters supplied by a power source housed within the modular device.

2. A device as recited in claim 1, wherein the power source comprises a trickle charger.

3. A device as recited in claim 1, wherein the power source comprises a battery.

4. A device as recited in claim 1, wherein the power source comprises a transformer.

5. A system as recited in claim 1, wherein the xDSL transmission scheme comprises an asymmetric digital subscriber line transmission scheme.

6. A modular device as recited in claim 1, wherein the first filter comprises an active high pass filter and the second filter comprises an active low pass filter.

7. A device as recited in claim 1, wherein the common connector, the data connector and the voice connector comprise RJ11 telephone connectors.

8. A system for using a internal telephone wire network as a transmission medium for concurrently transmitting both voice band signals and data band signals, the data band signals being transmitted out-of-band with the voice band signals, the system comprising:

an internal telephone wire network provided within a customer premise and having an interface for coupling the internal wire network to a subscriber line, the subscriber line being used to connect the customer premise to a central office of a telephone service provider;

a modular splitter capable of being removably connected to the internal wire network, the modular splitter comprising:

(a) a male connector member removably connectable to the internal wire network interface;

(b) a voice connector having a voice connector receptacle;

(c) a data connector having a data connector receptacle;

(d) a voice device coupled to the internal telephone wire network via the male connector member and the voice connector to communicate with the central office using voice band signals;

(e) a voice band pass filter coupled between the male connector member and the voice connector to filter out data band signals transmitted on the internal telephone wire network;

(f) a first data device coupled to the internal telephone wire network via the male connector member and the data connector to communicate with a second data device using data band signals;

(g) a data band pass filter coupled between the male connector member and the data connector to filter out voice band signals transmitted on the internal telephone wire network; and wherein the voice band pass filter and the data band pass filter are active filters supplied by a power source housed within the modular splitter.

9. A system as recited in claim 8, wherein the voice band signals and the data band signals are transmitted on the internal telephone wire network using a digital subscriber line (xDSL) transmission scheme.

10. A system as recited in claim 9, wherein the xDSL transmission scheme comprises an asymmetric digital subscriber line transmission scheme.

11. A system as recited in claim 9, wherein the first data device comprises an xDSL modem.

12. A system as recited in claim 9, wherein the first and second data devices include xDSL modems.

13. A system as recited in claim 9, wherein the first data device comprises an xDSL modem and the second data device comprises a remote xDSL modem, the remote xDSL modem communicating with the internal telephone wire network via the subscriber line.

14. A system as recited in claim 12, wherein the second data device resides within the customer premises.

15. A system as recited in claim 12, wherein the second data device resides at the central office of the telephone service provider.

* * * * *